(12) United States Patent
Hils et al.

(10) Patent No.: US 10,646,099 B2
(45) Date of Patent: May 12, 2020

(54) DISPENSING DEVICE

(71) Applicant: Miele & Cie. KG, Guetersloh (DE)

(72) Inventors: Fabian Hils, Hoevelhof (DE); Dirk Wegener, Bielefeld (DE)

(73) Assignee: MIELE & CIE. KG, Guetersloh (DE)

(*) Notice: Subject to any disclaimer, the term of this patent is extended or adjusted under 35 U.S.C. 154(b) by 4 days.

(21) Appl. No.: 15/725,297

(22) Filed: Oct. 5, 2017

(65) Prior Publication Data

US 2018/0125327 A1 May 10, 2018

(30) Foreign Application Priority Data

Oct. 6, 2016 (DE) .................. 10 2016 118 922
Oct. 6, 2016 (DE) .................. 10 2016 118 930
Oct. 6, 2016 (DE) .................. 10 2016 118 946
Nov. 18, 2016 (DE) .................. 10 2016 122 242

(51) Int. Cl.
*A47L 15/44* (2006.01)
*G01F 11/10* (2006.01)
*G01F 11/00* (2006.01)

(52) U.S. Cl.
CPC .......... *A47L 15/449* (2013.01); *A47L 15/4463* (2013.01); *A47L 15/4472* (2013.01); *G01F 11/10* (2013.01); *G01F 11/006* (2013.01)

(58) Field of Classification Search
CPC .............. A47L 15/449; A47L 15/4463; A47L 15/4472; G01F 11/006; G01F 11/10
See application file for complete search history.

(56) References Cited

U.S. PATENT DOCUMENTS 4,735,228 A    4/1988  Boedecker et al.
5,261,432 A   11/1993  Sandrin
5,694,794 A * 12/1997  Jerg ................ A47L 15/4409
                                                   134/104.1

(Continued)

FOREIGN PATENT DOCUMENTS

CA      2844157 A1    10/2007
DE      3620900 A1    12/1987

(Continued)

OTHER PUBLICATIONS

Machine translation of DE-102013104391-A1, dated Oct. 2014. (Year: 2014).*

(Continued)

*Primary Examiner* — Michael E Barr
*Assistant Examiner* — Kevin G Lee
(74) *Attorney, Agent, or Firm* — Leydig, Voit & Mayer, Ltd.

(57) ABSTRACT

In an embodiment the present invention provides a dispensing device for introducing a pourable detergent in metered amounts into a treatment chamber of a program-controlled cleaning appliance, in particular a dishwasher, the dispensing device including: a supply container for holding the detergent, the supply container having a reservoir chamber and a metering chamber terminating in a dispensing opening, the metering chamber being provided by a metering element that is movably disposed within the supply container and is movable from a non-metering position to a metering position; and a carrier unit which is rotatable by a motor and is configured to replaceably receive the supply container.

11 Claims, 12 Drawing Sheets

(56) References Cited

U.S. PATENT DOCUMENTS

| | | | | |
|---|---|---|---|---|
| 6,581,800 | B2 * | 6/2003 | Rodd | A47L 15/44 222/144 |
| 2006/0249547 | A1 | 11/2006 | Heinz-Dieter et al. | |
| 2009/0001101 | A1 * | 1/2009 | Zahradka | B65B 1/36 222/228 |
| 2011/0174344 | A1 * | 7/2011 | Cerruti | A47L 15/44 134/115 R |
| 2011/0247663 | A1 * | 10/2011 | Gadini | A47L 15/4454 134/115 R |
| 2011/0262318 | A1 * | 10/2011 | Hofte | C11D 17/041 422/272 |
| 2017/0143183 | A1 | 5/2017 | Wegener et al. | |

FOREIGN PATENT DOCUMENTS

| | | | | |
|---|---|---|---|---|
| DE | 8915683 | U1 | 1/1991 | |
| DE | 19837200 | A1 | 2/2000 | |
| DE | 102010003769 | A1 * | 10/2011 | A47L 15/4445 |
| DE | 102013104391 | A1 * | 10/2014 | A47L 15/4463 |
| DE | 102013104391 | A1 | 10/2014 | |
| DE | 102013110403 | A1 | 3/2015 | |
| EP | 0332152 | A1 | 9/1989 | |
| EP | 0457137 | A1 | 11/1991 | |
| EP | 0486790 | A1 | 5/1992 | |
| EP | 1704811 | A2 | 9/2006 | |
| EP | 3173006 | A1 | 5/2017 | |
| GB | 1204422 | A | 9/1970 | |

OTHER PUBLICATIONS

Machine translation of DE-102010003769-A1, dated Apr. 2010. (Year: 2010).*

\* cited by examiner

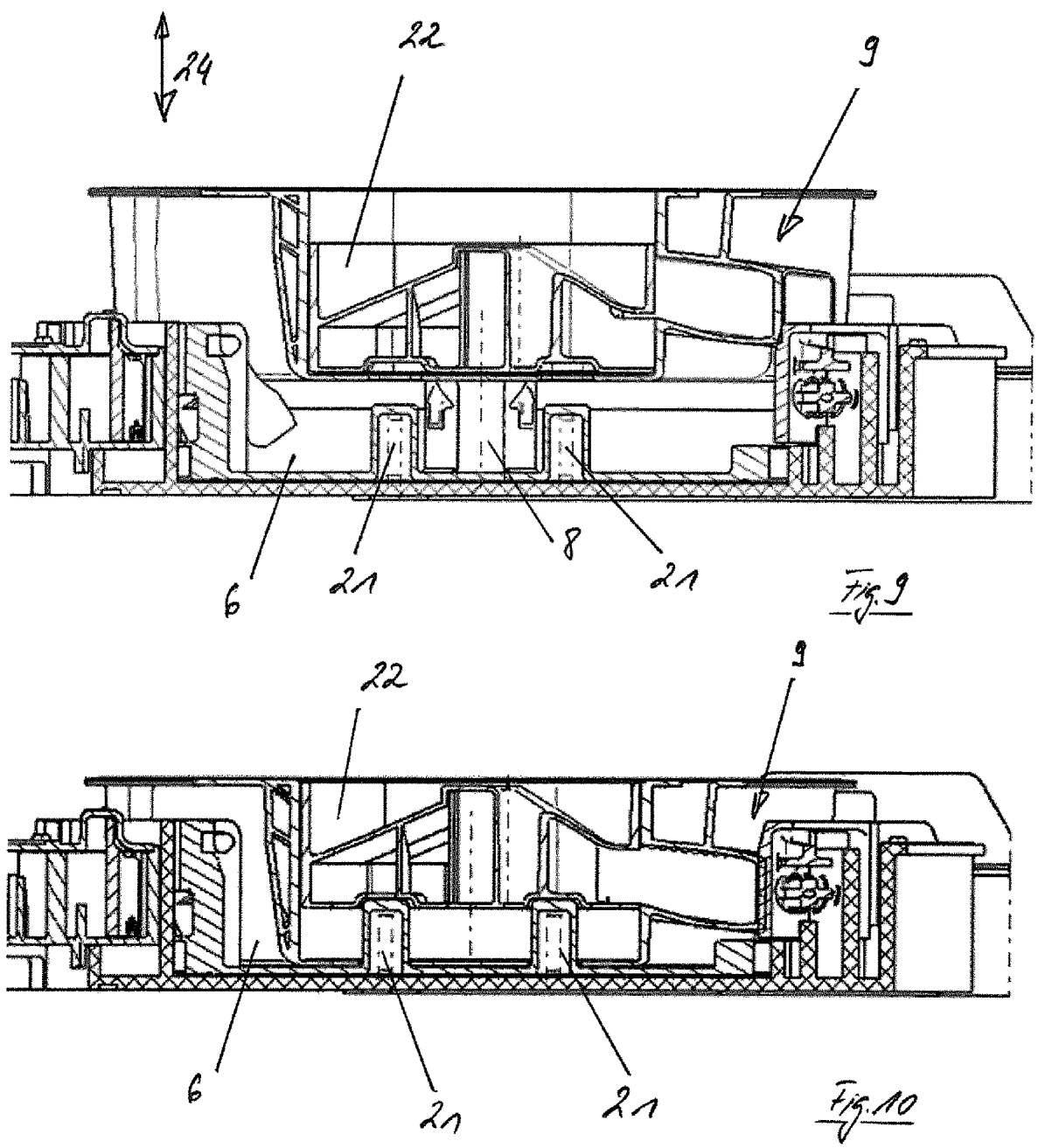

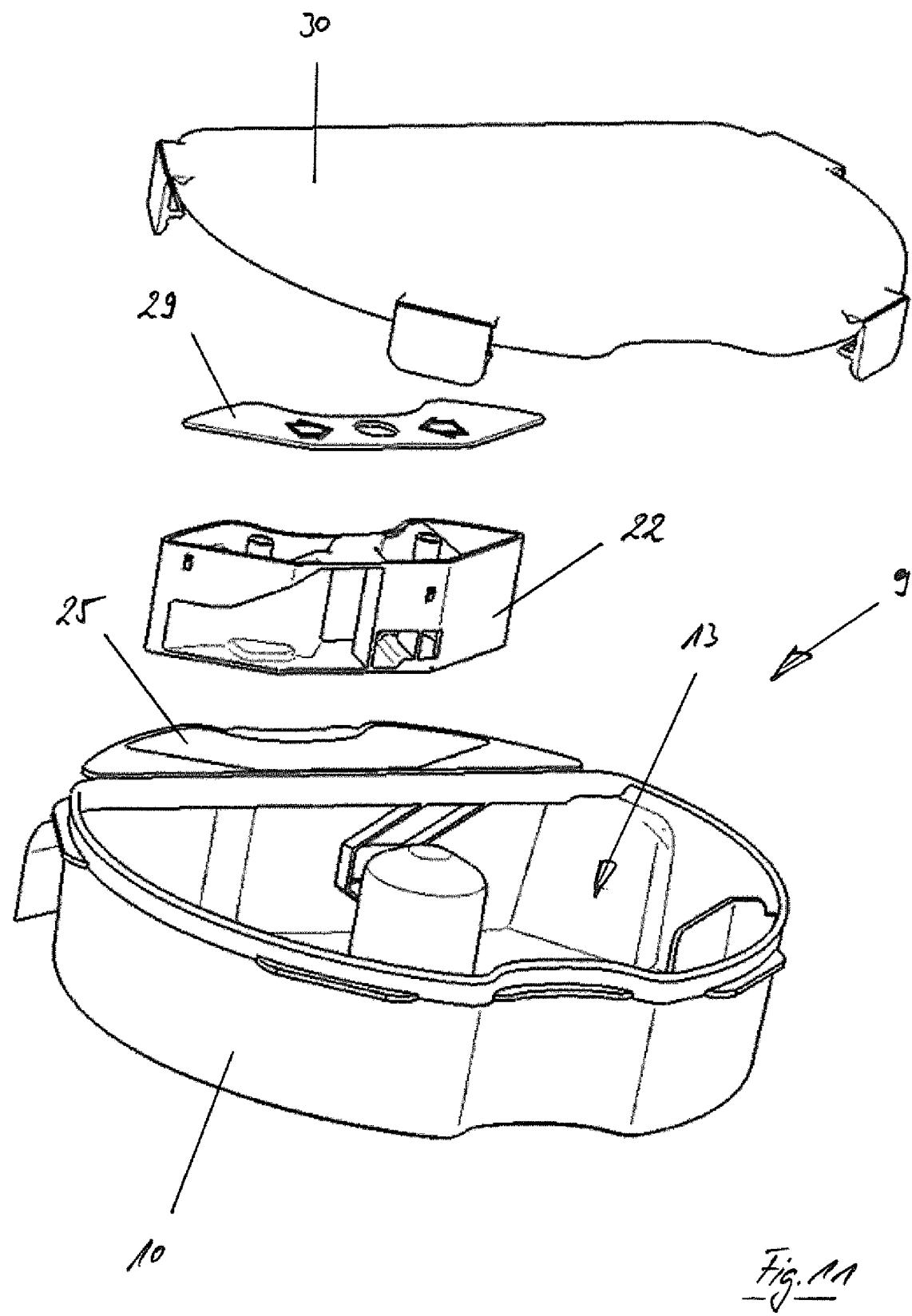

DISPENSING DEVICE

Priority is claimed to: German Patent Application No. DE 10 2016 122 242.9, filed on Nov. 18, 2016; German Patent Application No. DE 10 2016 118 922.7, filed on Oct. 6, 2016; German Patent Application No. DE 10 2016 118 930.8, filed on Oct. 6, 2016; and German Patent Application No. DE 10 2016 118 946.4, filed on Oct. 6, 2016.

FIELD

The present invention relates to a dispensing device for introducing a pourable detergent in metered amounts into a treatment chamber of a program-controlled cleaning appliance, in particular a dishwasher, the dispensing device having a supply container for holding the detergent and a carrier unit which is rotatable by a motor and replaceably receives the supply container, the supply container having a reservoir chamber and a metering chamber terminating in a dispensing opening.

BACKGROUND

Program-controlled cleaning appliances in general, and dishwashers in particular, are per se well known in the art and, therefore, need not be specifically described herein.

Cleaning appliances of the type in question typically have a washing tub providing a treatment chamber, also called washing chamber. The treatment chamber is accessible to a user via a loading opening which can be closed in a fluid-tight manner by a pivotably mounted washing chamber door. During normal use, the washing tub serves to receive items to be washed which, in the case of a dishwasher, may be dishes, cutlery items and/or the like.

In order to apply wash water, also called wash liquid, to the items to be washed, the cleaning appliance has a spray device disposed inside the washing tub. This spray device generally provides rotatable spray arms, typically two or three such spray arms. During normal use, wash liquid is applied to the items to be washed by rotating spray arms.

In order to achieve optimized cleaning results, process chemicals are used which are delivered into the washing chamber during a cleaning operation. Typically, the process chemicals are added to the wash liquid. Such process chemicals may, for example, be detergents, which are added into the washing chamber of the cleaning appliance in a program-controlled manner at a particular point in time during the operational cycle.

Detergents in liquid and solid form are known in the art. Solid detergents may be in the form of pourable powders or so-called tabs; i.e., in tablet form. However, practice has shown that the comparatively best results can be achieved with pourable detergents in powder form.

When pourable detergents in powder form are used, the user must manually measure out the detergent each time before a cleaning cycle is started. For this purpose, a cleaning appliance typically has a supply container which is disposed on the inner side of the door and has to be charged with a manually selected amount of detergent. During operation, this supply container opens at a particular point in time during the wash cycle, allowing the detergent held in the supply container to be washed out by the wash liquid present in the washing chamber of the cleaning appliance.

To be able to store detergent for a plurality of wash cycles, avoiding the need to manually measure out detergent each time before a wash cycle is started, dispensing devices have been proposed, such as the one described in DE 10 2013 104 391 A1.

This known dispensing device has a replaceable supply container for storing an amount of detergent sufficient for a plurality of wash cycles. The supply container is rotatable about an axis of rotation. During a normal dispensing event, the supply container is rotated in a program-controlled manner. For this purpose, a motor-driven drive device is provided which, when operated, causes rotational movement of the supply container. In the process, the motor-driven drive device cooperates with a carrier unit which replaceably receives the supply container.

To permit release of detergent, the supply container has a dispensing opening. During operation, detergent is released in portions through this opening. Such a release of detergent occurs in response to a rotational movement of the supply container. Each 360° rotation of the supply container causes equal portions of detergent to be fed to the dispensing opening and released from there into the washing chamber of the cleaning appliance via an interposed channel system.

To be able to effect metering of the detergent, the supply container has a reservoir chamber, on the one hand, and a metering chamber, on the other hand. The reservoir chamber is used for storing the detergent, and the metering chamber is used for dispensing the detergent in portions during operation. To this end, the metering chamber is divided into two fluidically connected sections, namely a metering space and a dispensing channel, which are separated by a barrier. The barrier bounds the metering space in such a manner that during a rotational movement of the supply container, first the metering space is filled with an amount of detergent determined by the size of the metering space. During further rotational movement, the amount of detergent introduced into the metering space is conveyed past the barrier into the dispensing channel and toward the dispensing opening without any additional detergent flowing from the reservoir chamber into the metering space. Thus, during normal use, the detergent passes from the reservoir chamber through the passage opening into the metering space of the metering chamber, the size of the metering space determining the portioned amount of detergent. When the supply container is rotated further, the portioned amount of detergent exits the metering space and passes through the dispensing channel to the dispensing opening. During this process, no additional detergent can flow from the reservoir chamber through the passage opening into the metering space of the metering chamber due to the continued rotation of the supply container.

Dispensing devices of the aforedescribed type have proven practical in everyday use. Nevertheless, there is a need for improvement, particularly with respect to increasing the ease of use for the user. It is, therefore, an object of the present invention to improve a dispensing device of the above-mentioned type in such a way that it makes handling easier for the user because of the design.

SUMMARY

In an embodiment, the present invention provides a dispensing device for introducing a pourable detergent in metered amounts into a treatment chamber of a program-controlled cleaning appliance, in particular a dishwasher, the dispensing device comprising: a supply container configured to hold the detergent, the supply container having a reservoir chamber and a metering chamber terminating in a dispensing opening, the metering chamber being provided by a metering element that is movably disposed within the supply container and is movable from a non-metering position to a metering position; and a carrier unit which is rotatable by a motor and is configured to replaceably receive the supply container.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 9 is a schematic cross-sectional view of the inventive dispensing device with the supply container shown in a non-inserted position;

FIG. 10 is a view showing the dispensing device of FIG. 9 with the supply container in the inserted position;

FIG. 11 is a schematic exploded view of an inventive supply container according to a second embodiment;

DETAILED DESCRIPTION

Figure 1:
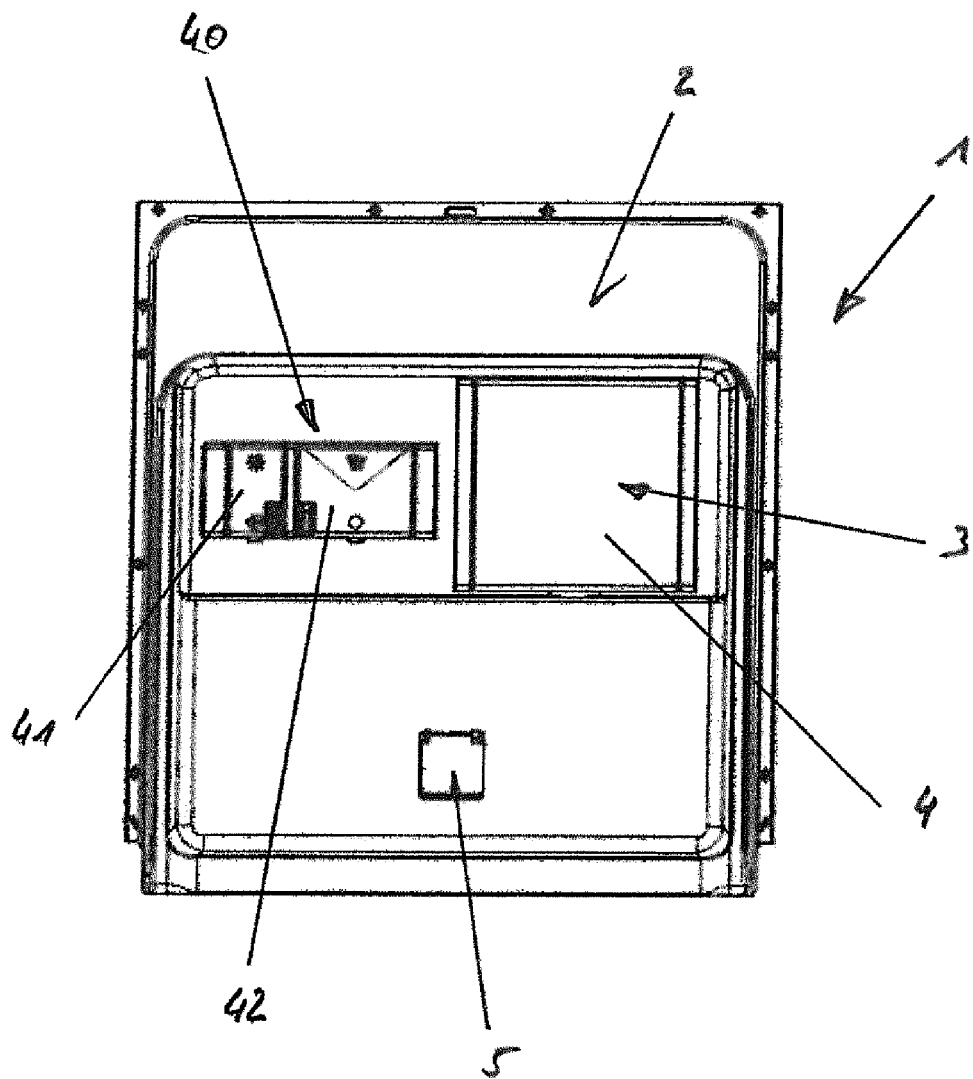
FIG. 1 is a schematic view of the inner side of a washing chamber door of a dishwasher.

Embodiments of the present invention remedy problems of the prior art in that a metering element providing the metering chamber is provided that is movably disposed within the supply container and is movable from a non-metering position to a metering position. It is only when the metering element is in the metering position that detergent can be conveyed from the reservoir chamber into the metering chamber during normal use. Otherwise; i.e., when the metering element is in the non-metering position, it is impossible to convey detergent from the reservoir chamber into the metering chamber.

Prior to first use of the supply container, the metering element is in its non-metering position, in which the fluid connection between the reservoir chamber and the metering chamber provided by the metering element is interrupted. Therefore, detergent stored in the supply container cannot flow over into the metering chamber. Thus, if unwanted ingress of moisture should occur while the metering element is in its non-metering position, clumping of detergent may occur only in the reservoir chamber, but not in the metering chamber. A possible clumping of detergent in the reservoir chamber is not as serious as a clumping in the metering chamber, as may occur in the prior art. This is because, on the one hand, any lumps which may form in the reservoir chamber are broken up during operational rotation of the supply container due to the size of the reservoir chamber and, on the other hand, the metering chamber forms a type of labyrinth passage, which is more susceptible to formation of unwanted detergent deposits than the reservoir chamber.

Moreover, since the fluid connection between the reservoir chamber and the metering chamber is interrupted until first use while the metering element is in its non-metering position, it is ensured that the detergent can be properly portioned during first use. Thus, die design according to the present invention serves also as a storage and shipping closure because it effectively prevents detergent from migrating into the metering chamber prior to first use.

As soon as the supply container is properly inserted into the dispensing device for purposes of first use, the metering element is automatically moved from the non-metering position to the metering position. In the metering position, a fluid connection is established between the reservoir chamber and the metering chamber, so that during a normal dispensing event, detergent held in the reservoir chamber can flow into the metering chamber provided by the metering element.

If the supply container takes the form of a disposable supply container; i.e., no provision is made for the supply container to be refilled, it is not possible or intended for the metering element to be moved from a previously assumed metering position back to the non-metering position. This is because no provision is made to remove the supply container from the dispensing device as long as the supply container is not completely empty yet.

However, if the supply container is designed as a reusable container; i.e., if the supply container can be refilled with detergent by a user when necessary, the metering element can advantageously be manually moved by the user from the previously assumed metering position back to the non-metering position. Thus, after the supply container has been emptied in accordance with the intended purpose thereof, the metering element can be moved back to its original position; i.e., its non-metering position, prior to refilling the supply container with detergent.

In accordance with another feature of the present invention, the metering element is movable in the height direction of the supply container. Thus, a linear movement of the metering element takes place during operation. Alternatively, provision may be made for the metering element to be moved from the non-metering position to the metering position by a rotational movement. However, a linear movement is constructionally easier to implement and less prone to failure in practical operation. Therefore, this design variant is preferred.

In accordance with another feature of the present invention, the metering element has an inlet opening which cooperates with an outlet opening provided by the supply container when the metering element is in the metering position. Thus, both the metering element and the supply container provide an opening, the two openings cooperating with each other when the metering element is in the metering position. In the metering position, the inlet opening of the metering element and the outlet opening of the supply container are at least partially in register with each other, so that in a metering event, detergent can flow from the reservoir chamber into the metering chamber. As long as the metering element is in its non-metering position, the inlet opening and the outlet opening are not even partially in register with each other, and the wall in which the outlet opening of the supply container is formed serves as a closure element for the inlet opening of the metering element, the closure element interrupting the fluid connection between the reservoir chamber and the metering chamber.

In accordance with a further feature of the present invention, the carrier unit has an actuating unit cooperating with the metering element. This actuating unit serves to move the metering chamber from the non-metering position to the metering position as the supply container is properly inserted into the carrier unit. The actuating member may be, for example, a pin which, when the supply container is inserted in the carrier unit, extends through an opening provided in the supply container on the carrier unit side thereof. Thus, as the supply container is properly inserted into the carrier unit, the actuating unit passes through the openings provided in the supply container and comes into actuating contact with the metering element. In response to inserting the supply container into the carrier unit, the metering element is pushed upward in the height direction of the supply container and thereby moved from its non-metering position to the metering position.

In accordance with a further feature of the present invention, in order to enable, to the extent possible, a non-jamming movement of the metering element, two actuating units are provided, so that force can act on the metering element in a uniformly distributed manner.

In accordance with another feature of the present invention, locking means are provided to fix the metering element securely in both its non-metering position and its metering position, thereby preventing the metering element from being unintentionally moved from the non-metering position to the metering position or vice versa. Such locking means may, for example, be cams which project into the travel path of the metering element and past which the metering element can only pass when increased force is applied thereto by a user.

The present invention further provides a supply container adapted for removable placement in a dispensing device having one of the features described above. The advantages described earlier apply equally to a supply container configured in this manner. The supply container may be either refillable; i.e., designed as a reusable container, or designed as a disposable container. In the latter case, no provision is made for the supply container to be refilled by a user.

In a manner known per se, dishwasher 100 has a housing 101 that accommodates a washing tub 102. Washing tub 102, in turn, provides a treatment chamber, also called washing chamber 103, to receive items to be washed. To permit loading of washing chamber 103 with items to be washed, washing tub 102 has a loading opening 104. Loading opening 104 can be closed in a fluid-tight manner by a washing chamber door 1, which is supported so as to be pivotable about a horizontally extending pivot axis.

During normal use, wash liquid is applied to the items to be washed. To this end, dishwasher 100 is provided with a spray device 105. In the exemplary embodiment shown, spray device 105 includes an upper spray arm 106 and a lower spray arm 107.

Figure 14:
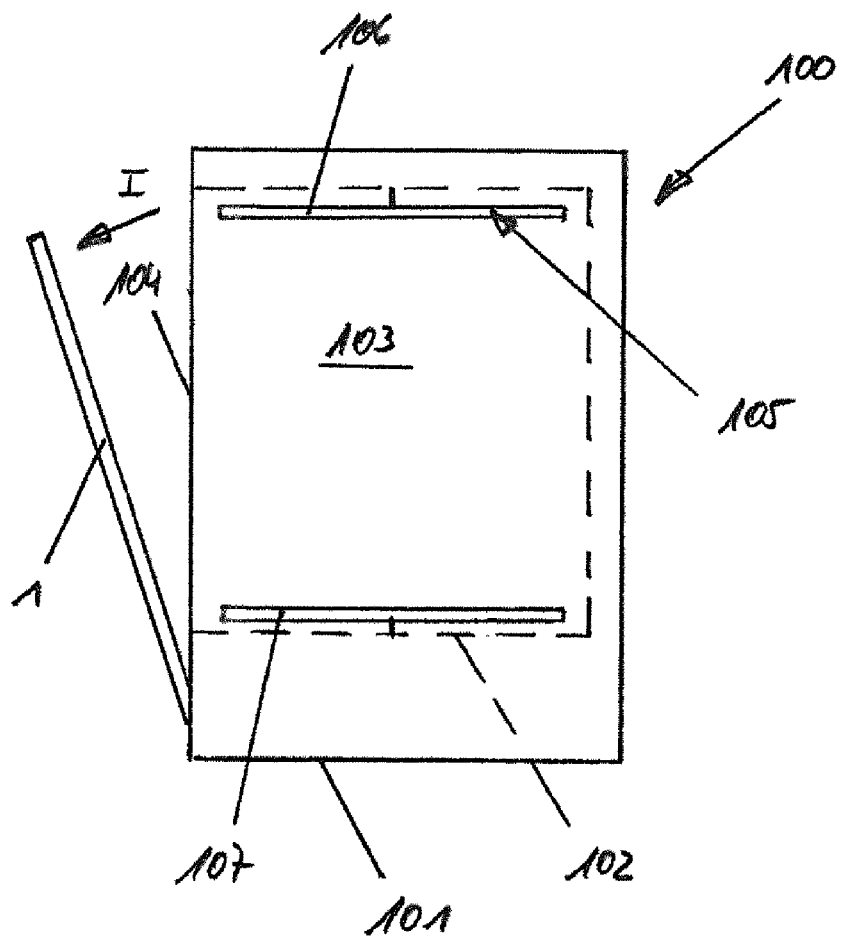
FIG. 14 shows, purely schematically, a side view of a cleaning appliance in the form of a dishwasher 100.

FIG. 1 shows washing chamber door 1 in elevation, looking at the inner side thereof in the direction of view denoted I in FIG. 14.

As can be seen from FIG. 1, washing chamber door 1 is provided on the inner side with a combination device 40 which is generally known in the art and which has a rinse aid reservoir 41 as well as a supply container 42 that has to be filled manually with detergent by a user for each wash cycle.

In addition to the combination device 40 generally known in the art, dishwasher 100 further has a dispensing device 3 which, like combination device 40, is disposed on inner side 2 of washing chamber door 1. When washing chamber door 1 is closed, closing cover 4 of dispensing device 3 is in the closed position, as shown in FIG. 1.

As will be described in greater detail below, dispensing device 3 has a supply container 9 holding pourable detergent. During normal use, detergent is conveyed from supply container 9 into washing chamber 103 of dishwasher 100. To this end, a dispensing outlet 5 is provided on inner side 2 of washing chamber door 1. This dispensing outlet 5 is equipped with a cover or a pivoted cover.

Figure 2:
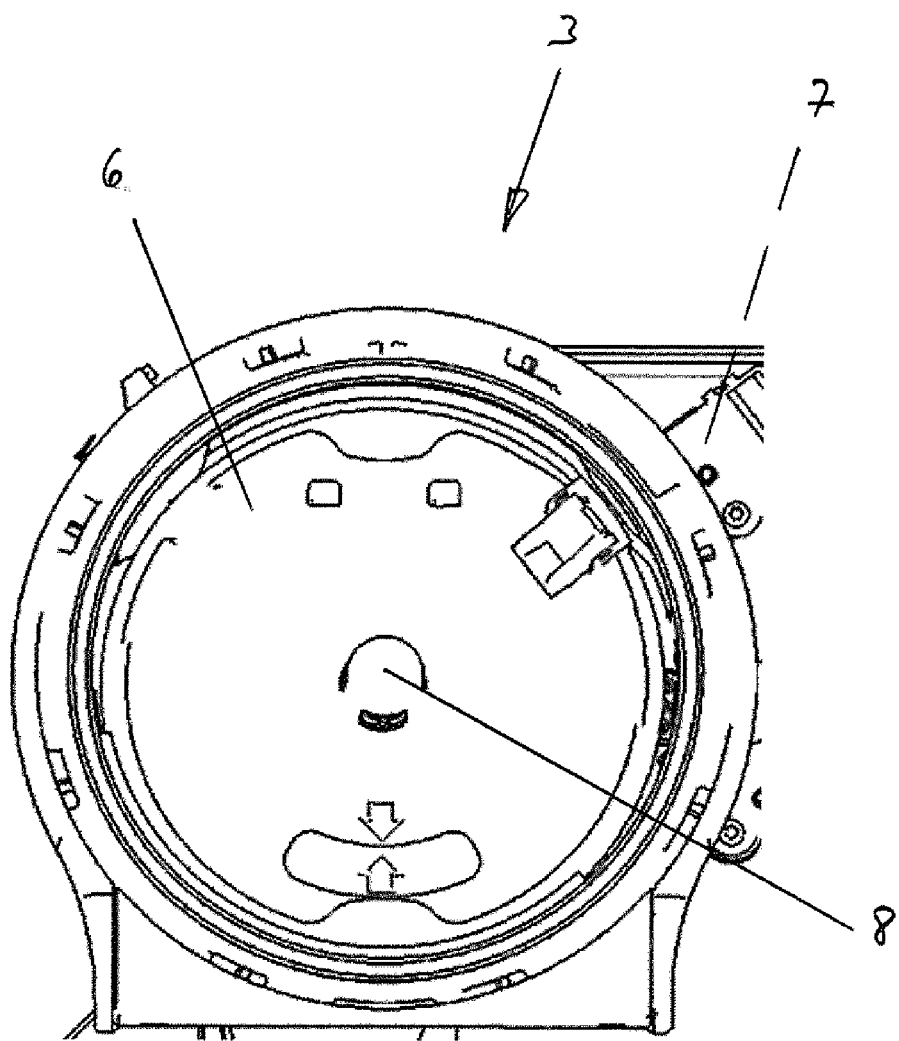
FIG. 2 is a schematic detail view of a dispensing device according to the present invention.

FIG. 2 shows a dispensing device 3 according to the present invention in a schematic perspective detail view, in which closing cover 4 is not shown for the sake of clarity.

As can be seen from the illustration in FIG. 2, dispensing device 3 has a drive device 7. Drive device 7 provides a housing and motor/transmission assembly. Drive device 7 accommodates a carrier unit 6. Drive device 7 allows carrier unit 6 to be rotated in a powered manner, namely about the axis of rotation defined by axle projection 8.

Figure 3:
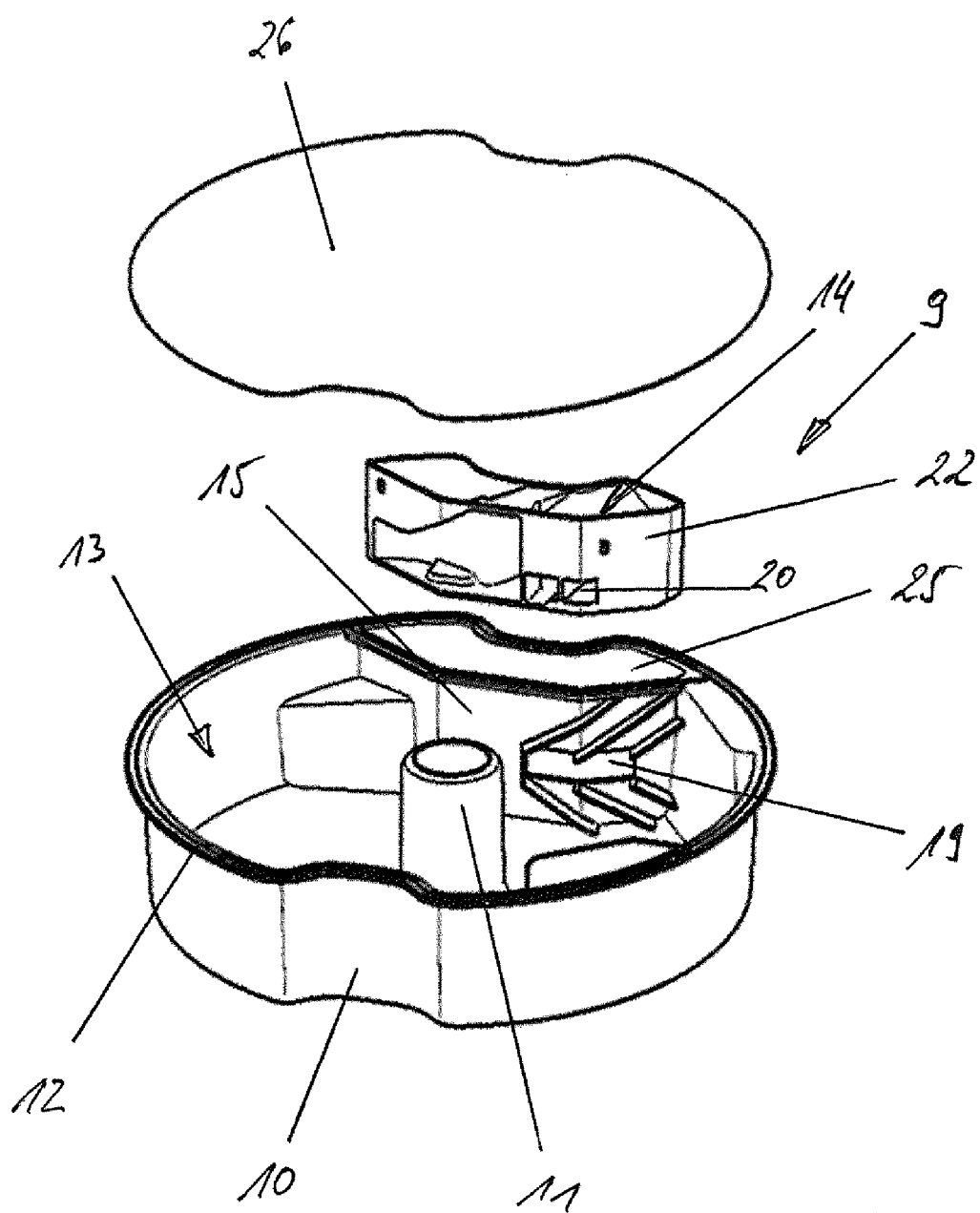
FIG. 3 is a schematic exploded view of an inventive supply container according to a first embodiment.

Dispensing device 3 further has a supply container 9, as illustrated, for example, in FIG. 3. Supply container 9 serves to hold an amount of detergent sufficient for a plurality of wash cycles. For each wash cycle, a portioned amount of detergent is withdrawn from the supply container and delivered into washing chamber 103.

Supply container 9 can be replaceably inserted by a user into carrier unit 6 of dispensing device 3. Carrier unit 6 holds supply container 9 in a non-rotatable manner, so that when carrier unit 6 is rotated in a powered manner, supply container 9 accommodated therein is rotated along with it, namely about the axis of rotation defined by axle projection 8.

Viewing FIGS. 3 through 6 together, it can be seen that supply container 9 has a main body 10. This main body 10 is provided with a dome 11 which, when supply container 9 is inserted in carrier unit 6, receives the axle projection provided by carrier unit 6, which allows for positionally accurate alignment of supply container 9 relative to carrier unit 6.

Main body 10 further provides a circumferential rim 12, which supports a film 26 for closing supply container 9 at the top. Preferably, film 26 is welded peripherally to rim 12 of the main body.

Figure 8:
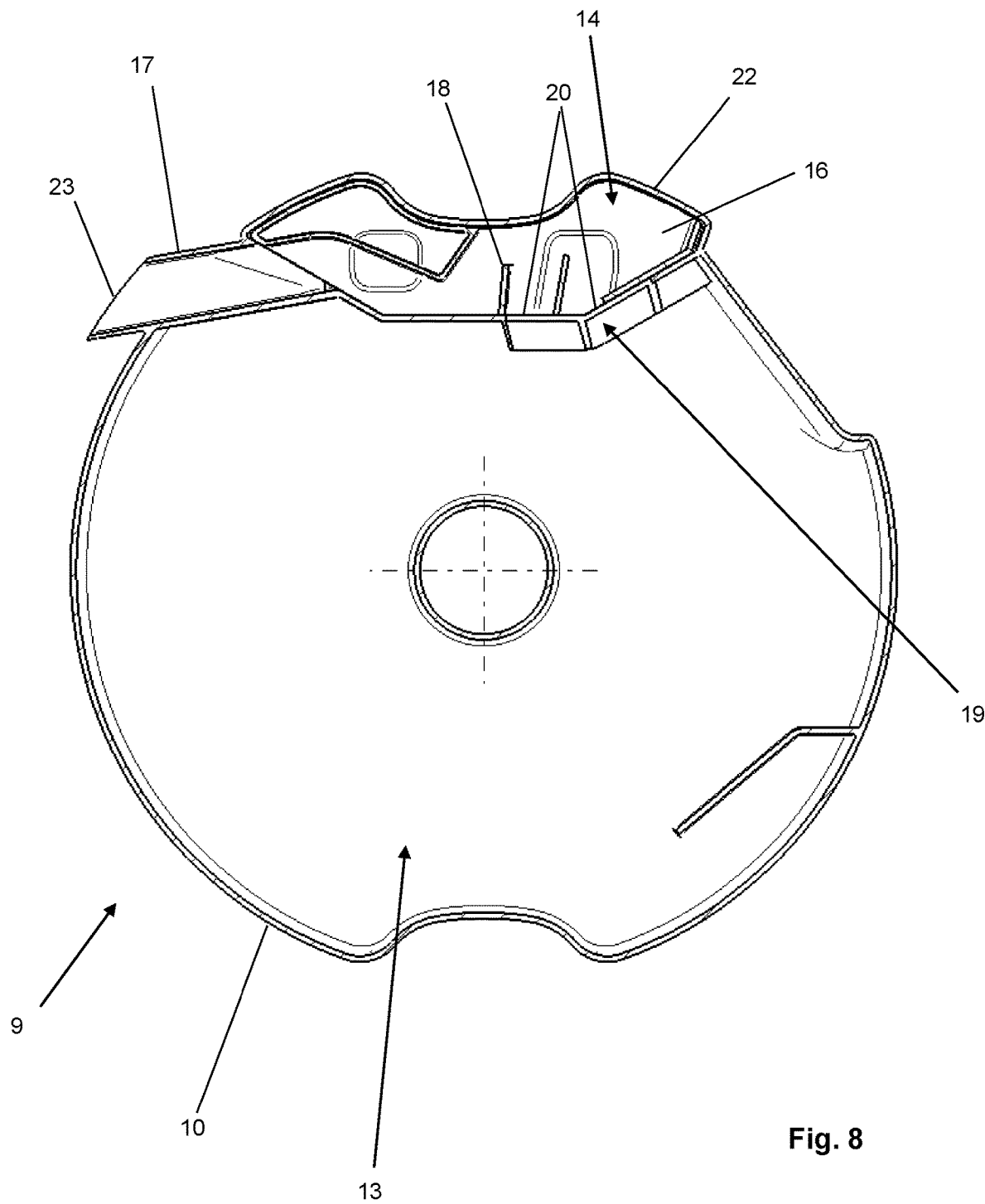
FIG. 8 is a cross-sectional top view of the supply container of FIG. 3.

Main body 10 of supply container 9 provides both a reservoir chamber 13 and a compartment 25, which are separated by a dividing wall 15. Reservoir chamber 13 serves for storing detergent, whereas compartment 25 serves to receive a metering element 22 which, in turn, provides a metering chamber 14 which serves for dispensing detergent in portions during normal use. As can be seen particularly in the cross-sectional view of FIG. 8, metering chamber 14 provides a so-called metering space, which is narrowed by a dispensing barrier 18, so that an overall labyrinth-like metering chamber 14 is formed which, during operation, provides for the portioning of the detergent to be released into the treatment chamber.

In the exemplary embodiment shown, a dispensing channel 17 provided by supply container 9 is disposed downstream of metering chamber 14 in fluid connection therewith, dispensing channel 17 terminating in dispensing opening 23. Thus, detergent released from reservoir chamber 13 may flow through metering chamber 14 into dispensing channel 17 and via dispensing opening 23 toward the treatment chamber of the dishwasher.

Figure 4:
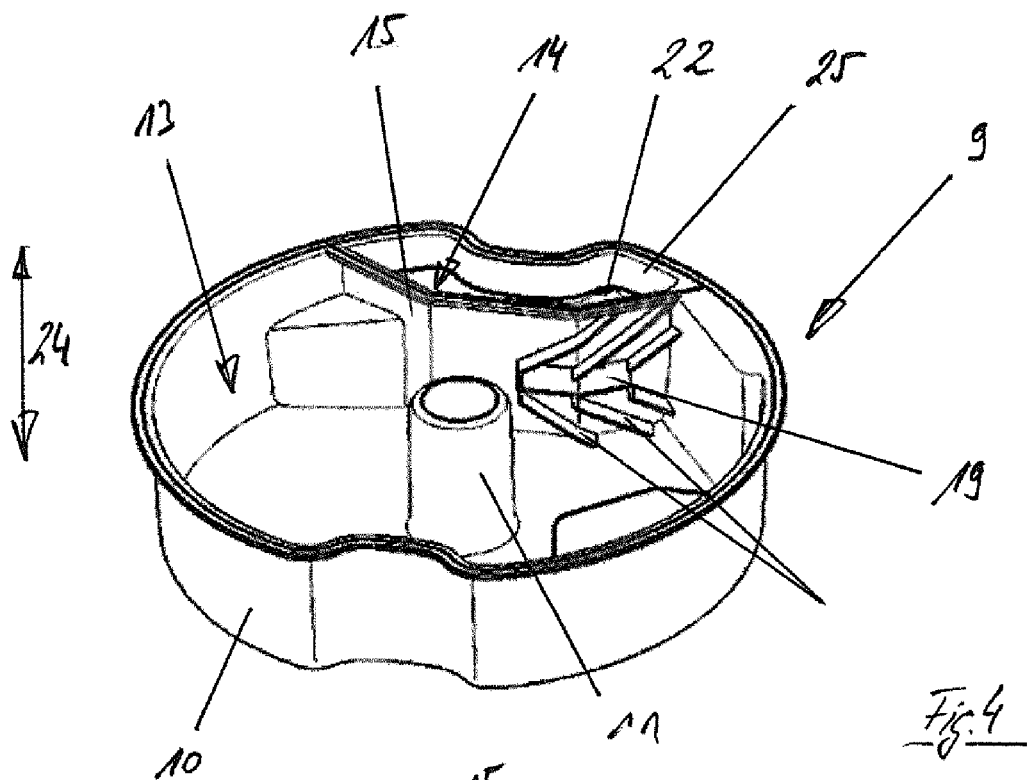
FIG. 4 is a schematic view showing the supply container of FIG. 3 with a metering element in the non-metering position.
Figure 5:
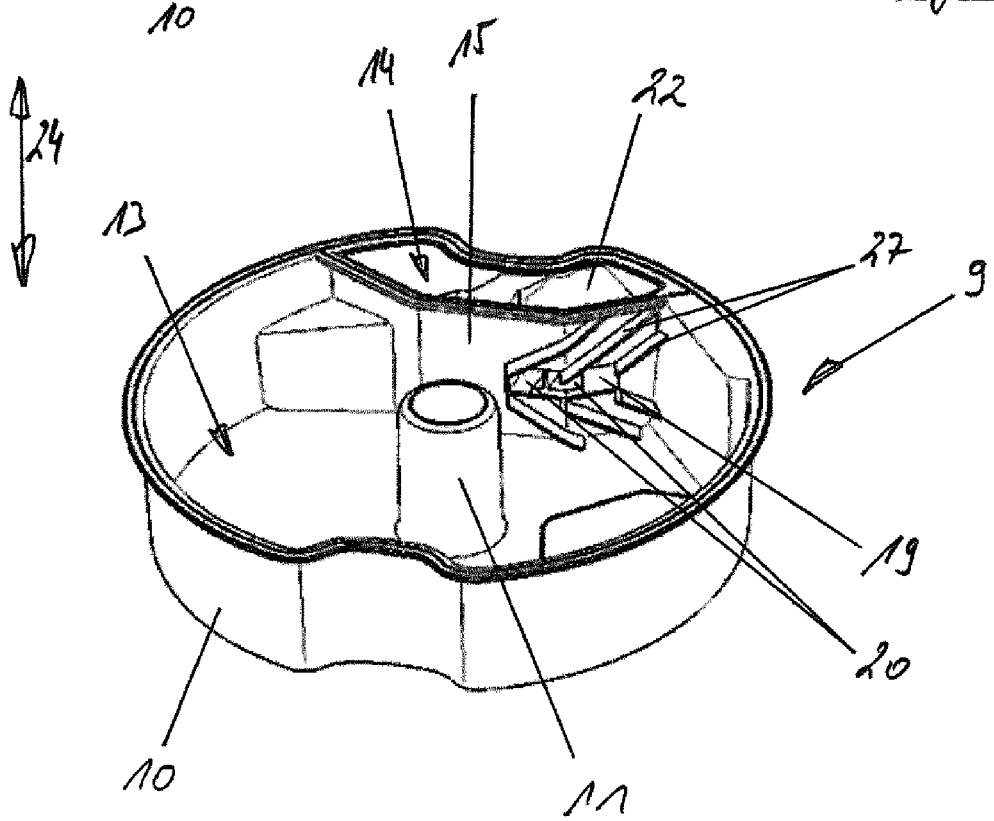
FIG. 5 is a view showing the supply container of FIG. 4 with a metering element in the metering position.
Figure 6:
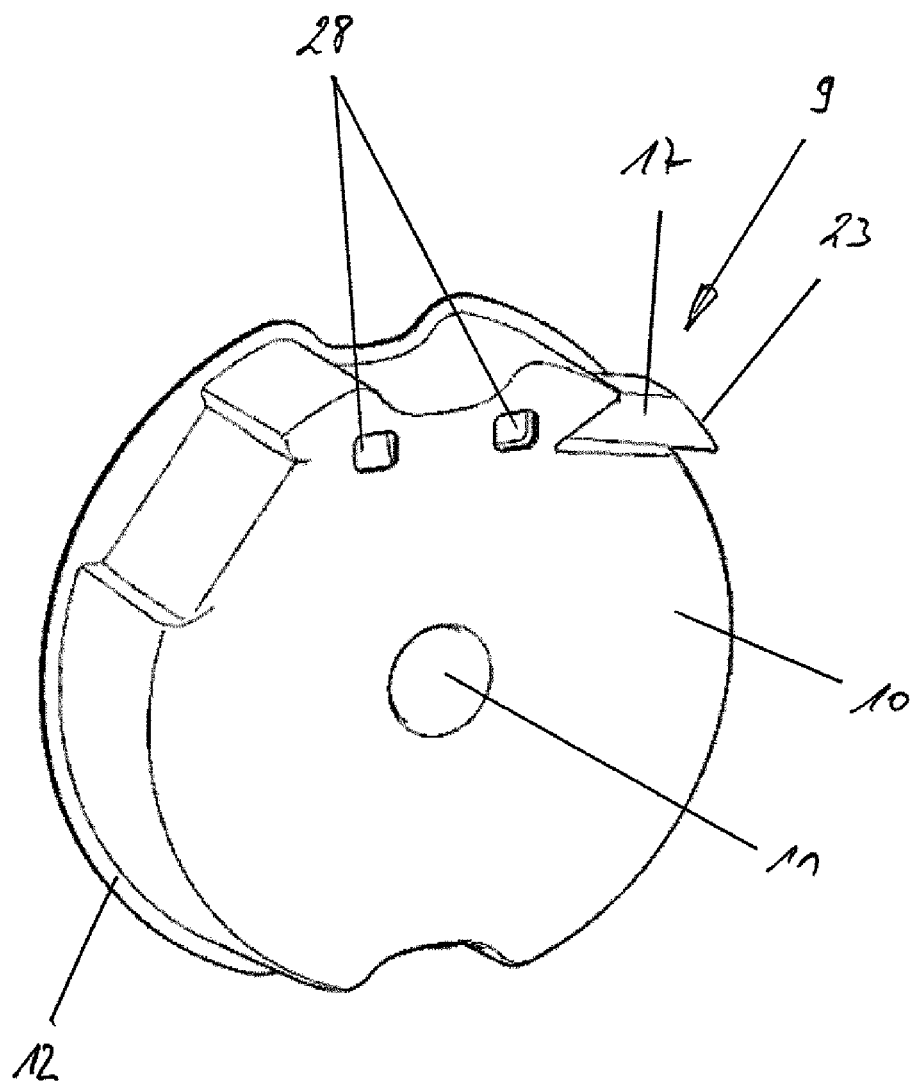
FIG. 6 is a rear view of the supply container of FIG. 3.
Figure 7:
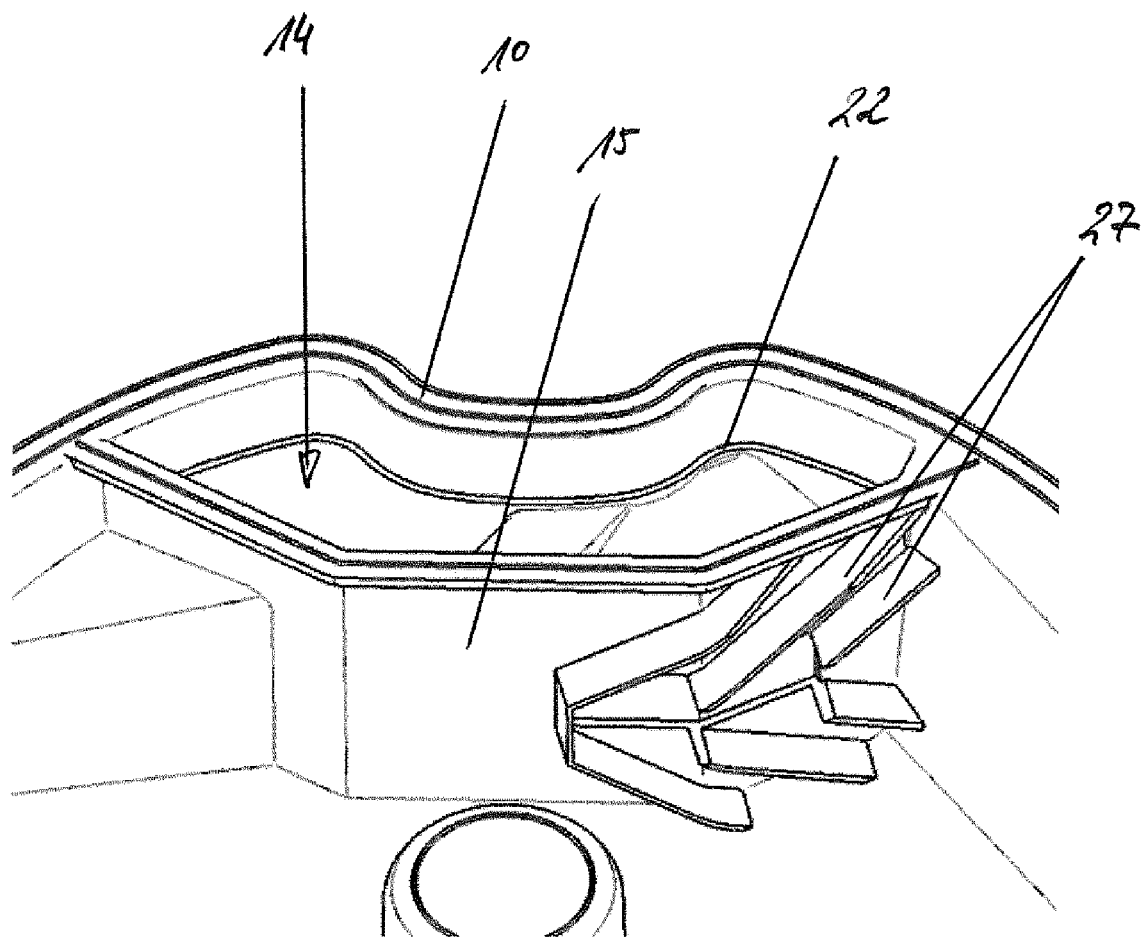
FIG. 7 is a schematic perspective detail view of the supply container of FIG. 3.

As is apparent, in particular, when viewing FIGS. 4 and 5 together, metering element 22, which is received in compartment 25 and provides metering chamber 14, can assume two positions in relation to main body 10 of supply container 9. For this purpose, metering element 22 can be moved in height direction 24.

FIG. 4 shows metering element 22 in its non-metering position. In contrast, FIG. 5 depicts a metering element 22 which has been moved upward in height direction 24 to a position in which it is in its metering position.

To permit detergent to be conveyed from reservoir chamber 13 into metering chamber 14, main body 10 of supply container 9 has an outlet opening 19, which is surrounded by ribs 27 disposed in a funnel-like arrangement to facilitate the conveyance of detergent into metering chamber 14.

In the exemplary embodiment shown, metering element 22 is provided with two inlet openings 20 corresponding to outlet opening 19. As shown in FIG. 5, inlet openings 22 come into coincidence with outlet opening 19 when metering element 22 is in its metering position. In the non-metering position shown in FIG. 4, inlet openings 20 come to rest below outlet opening 19 in height direction 24, so that they are closed by the closure element provided by dividing wall 15 between reservoir chamber 13 and compartment 25.

Actuating unit 21 provided on the carrier unit serve to permit metering element 22 to be moved from the non-metering position shown in FIG. 4 to the metering position shown in FIG. 5 when supply container 9 is inserted for the first time into carrier unit 7. In the exemplary embodiment shown, actuating unit 21 is configured as pins, as can be seen, in particular, in FIGS. 9 and 10. During normal use, the actuating unit 21 engages into openings 28 (most clearly shown in FIG. 6) formed in the bottom of main body 10 of supply container 9.

The cross-sectional view of FIG. 9 shows dispensing device 3 in a condition in which supply container 9 has not yet been inserted. In this condition of supply container 9, metering element 22 is still in its non-metering position. As soon as supply container 9 is properly inserted downwardly into carrier unit 6 in height direction 24, actuating unit 21 of dispensing device 3, which is configured as pins, passes through openings 28 provided on the supply container, thereby coming into contact with metering element 22. When supply container 9 is moved further downward in height direction 24 and properly inserted into carrier unit 6, metering element 22 received in compartment 25 is driven (i.e., moved) upward in height direction 24, so that, when supply container 9 is properly inserted in dispensing device 3, metering element 22 is in its metering position shown in FIG. 5, as can also be seen from the illustration in FIG. 10.

The supply container shown in FIGS. 3 through 10 is designed as a disposable container; i.e., it cannot be refilled with detergent by a user. An alternative embodiment can be seen in FIGS. 1 through 13, which show a reusable supply container that can be refilled by a user.

Figure 12:
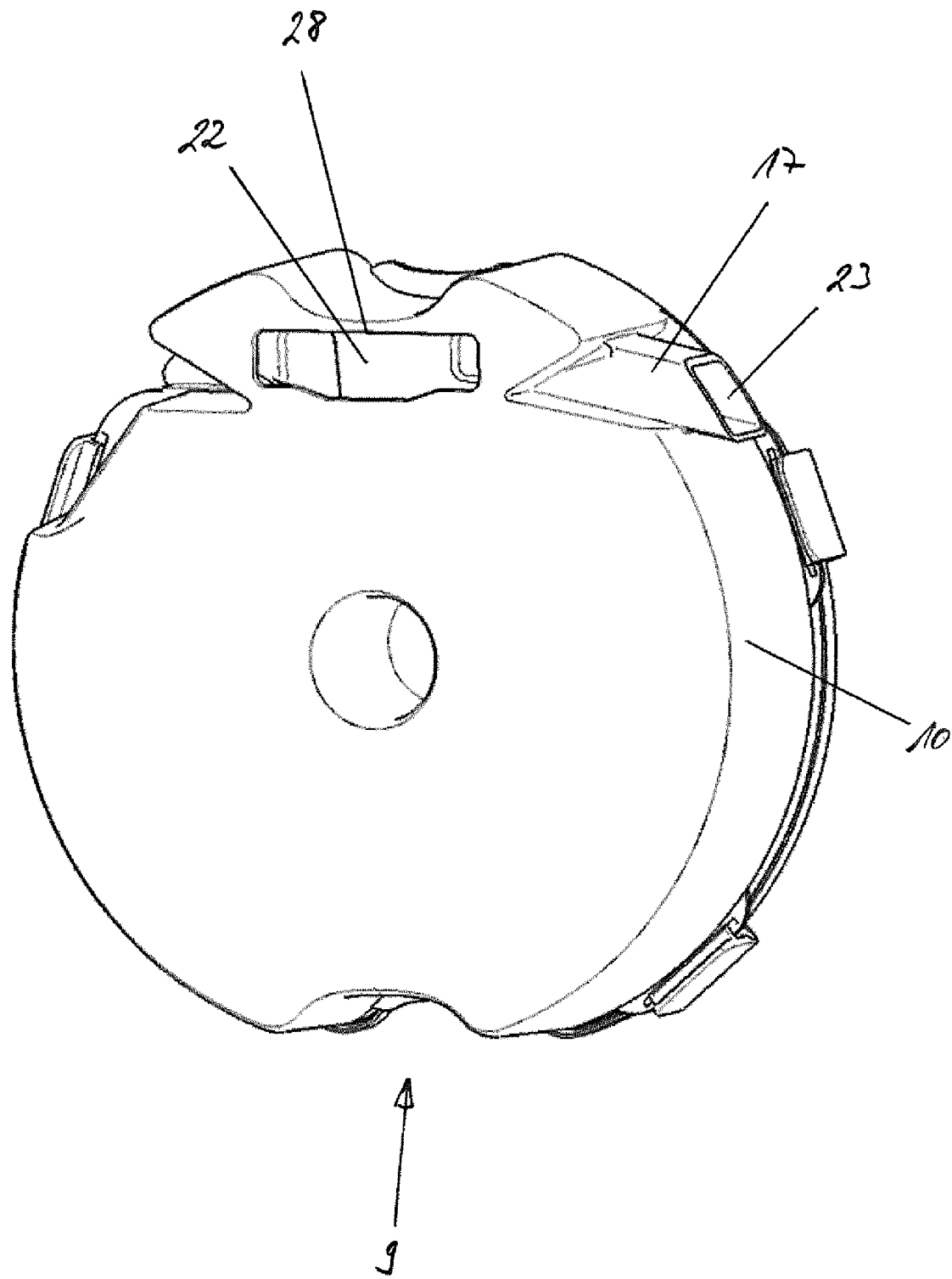
FIG. 12 is a rear view of the supply container of FIG. 11.
Figure 13:
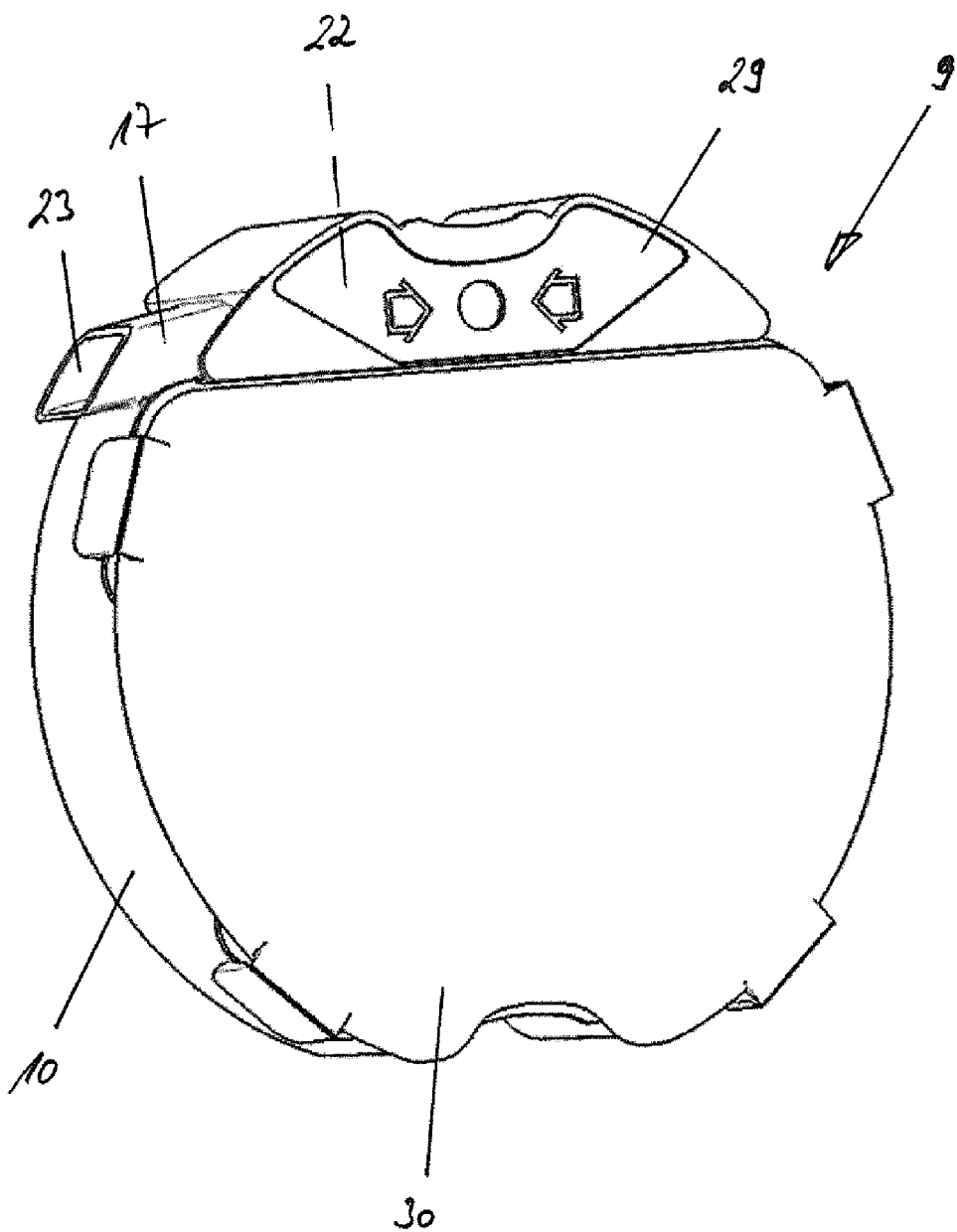
FIG. 13 is a schematic plan view showing the supply container of FIG. 11 from above.

The supply container embodied as shown in FIGS. 11 through 13 does not have a welded-on film 26, but a cover 30 which can be removed from main body 10 of supply container 9 by a user for access to reservoir chamber 13. Accordingly, the supply container can be refilled with detergent when cover 30 is removed. Once refilling is complete, cover 30 has to be placed back onto main body 10 to close supply container 9.

Since, in contrast to the aforedescribed embodiment, there is no film 26 that would also cover metering element 22, a separate cover 29 is provided for closing metering element 22. This cover can also be removed by a user, so that metering element 22 can be cleaned if necessary.

In the alternative embodiment, opening 28 cooperating with actuating unit 21 provided on the carrier unit is comparatively large, as can be seen in the rear view of FIG. 12. Preferably, opening 28 is of a size sufficient to allow a user to pass a finger or an auxiliary device therethrough in order to push metering element 22 upwardly out of compartment 25. This allows the metering element to be removed from supply container 9 for manual cleaning.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 washing chamber door
2 inner side
3 dispensing device
4 closing cover
5 dispensing outlet
6 carrier unit
7 drive device
8 axle projection
9 reservoir
10 main body
11 dome
12 rim
13 reservoir chamber
14 metering chamber
15 dividing wall
16 metering space
17 dispensing channel
18 dispensing barrier
19 outlet opening
20 inlet opening
21 actuating unit
22 metering element
23 dispensing opening
24 height direction 25 compartment
26 film
27 rib
28 opening
29 cover
30 cover
40 combination device
41 rinse aid reservoir
42 supply container
100 dishwasher
101 housing
102 washing tub
103 washing chamber
104 loading opening
105 spray device
106 spray arm
107 spray arm

What is claimed is:

1. A dispensing device for introducing a pourable detergent in metered amounts into a treatment chamber of a program-controlled cleaning appliance, in particular a dishwasher, the dispensing device comprising:

a supply container configured to hold the detergent, the supply container having a reservoir chamber, a dispensing opening, and a metering element including a metering chamber, the metering element being movably disposed within the supply container; and a carrier unit which is rotatable by a motor and is configured to replaceably receive the supply container, wherein an insertion of the supply container into the carrier unit moves the metering element from a non-metering position to a metering position in which the metering chamber provides a communication between the reservoir chamber of the supply container and the dispensing opening so as to provide a flow path of the detergent from the reservoir chamber into the treatment chamber of the appliance.

2. The dispensing device as recited in claim 1, wherein the metering element is movable in a height direction of the supply container.

3. The dispensing device as recited in claim 1, wherein the metering element has an inlet opening which cooperates with an outlet opening provided by the supply container when the metering element is in the metering position.

4. The dispensing device as recited in claim 1, wherein the carrier unit has an actuating unit configured to cooperate with the metering element.

5. The dispensing device as recited in claim 4, wherein the actuating unit comprises a pin which, when the supply container is inserted in the carrier unit, extends through an opening provided in the supply container on a carrier unit side thereof.

6. The dispensing device as recited in claim 4, further comprising a second actuating unit configured to cooperate with the metering element.

7. The dispensing device as recited in claim 1, wherein the metering element is closed at the top by a removable cover.

8. A supply container configured for removable placement in the dispensing device as recited in claim 1.

9. The supply container as recited in claim 8, wherein the supply container is reusable.

10. The supply container as recited in claim 8, wherein the supply container is disposable.

11. A dispensing device for introducing a pourable detergent in metered amounts into a treatment chamber of a program-controlled cleaning appliance, in particular a dishwasher, the dispensing device comprising:

a supply container configured to hold the detergent, the supply container having a reservoir chamber and a metering chamber terminating in a dispensing opening, the metering chamber being provided by a metering element that is movably disposed within the supply container and is movable from a non-metering position to a metering position; and a carrier unit which is rotatable by a motor and is configured to replaceably receive the supply container, wherein the carrier unit has an actuating unit configured to cooperate with the metering element, and wherein the actuating unit comprises a pin which, when the supply container is inserted in the carrier unit, extends through an opening provided in the supply container on a carrier unit side thereof.

* * * * *